Feb. 7, 1961  A. PINSON  2,970,799
HINGE PIN SUPPORT BRACKET
Filed March 26, 1957

INVENTOR.
ABRAHAM PINSON
BY

2,970,799

HINGE PIN SUPPORT BRACKET

Abraham Pinson, 232 Varet, St., Brooklyn, N.Y.

Filed Mar. 26, 1957, Ser. No. 648,681

6 Claims. (Cl. 248—230)

This invention relates to hinges in general and to hinge pin support brackets in particular.

In the construction of temporary and permanent steel wire fences and in the construction of fences, barriers and partitions using steel support posts, it is common practice and old in the art to mount two or more vertical hinge pins with their free ends extending upwards from a bracket which is secured about a cylindrical post. A gate element with corresponding female hinge elements may then be lifted and dropped into position so that the female hinge elements are disposed about the hinge pins.

In practice, no matter how light the gate element may be, the hinge pin support brackets are subjected to tremendous shocks, loads and strains which tend to move the hinge pin support brackets relative to the post to which they are secured. First there is the downward component of forces due to the weight of the gate element which tends to slide the brackets down the fence posts. Then there is added the twisting action exerted on the hinge pin support brackets tending to rotate them about the fence posts when the gate is at right angles to the post and the hinge pins. In addition there are other shocks and loads exerted upon the brackets when the gate element is slammed and otherwise harshly used in service. Heretofore conventional hinge pin support brackets have been relatively costly or they have not been adequate to withstand severe service.

An object of this invention is to provide an improved hinge pin support bracket which will withstand greater shocks, loads, and stresses over a longer period of service without moving relative to a supporting post.

An additional object of this invention is a provide an improved hinge pin support bracket which is cheaper to manufacture and lighter in construction.

Another object of this invention is to provide an improved hinge pin support bracket which will not be deformed when held to a support post more tightly by a U-bolt under greater tension.

Yet another object of this invention is to provide an improved hinge pin support bracket which will contact a support post over a relatively small area so that the support post will be somewhat deformed at the areas of contact so that the hinge pin support bracket will be more firmly secured to the support post.

Still another object of this invention is to provide an improved hinge pin support bracket which comprises a U-bolt, a bracket formed from a heavy sheet of metal with two inwardly bent ends and a downwardly bent horizontal flange, and a vertical hinge pin secured to the horizontal flange.

Additional objects, advantages and features of invention reside in the construction, arrangement and combination of parts involved in the embodiment of the invention and its practice otherwise as will be understood from the following description and accompanying drawings wherein.

Figure 1:
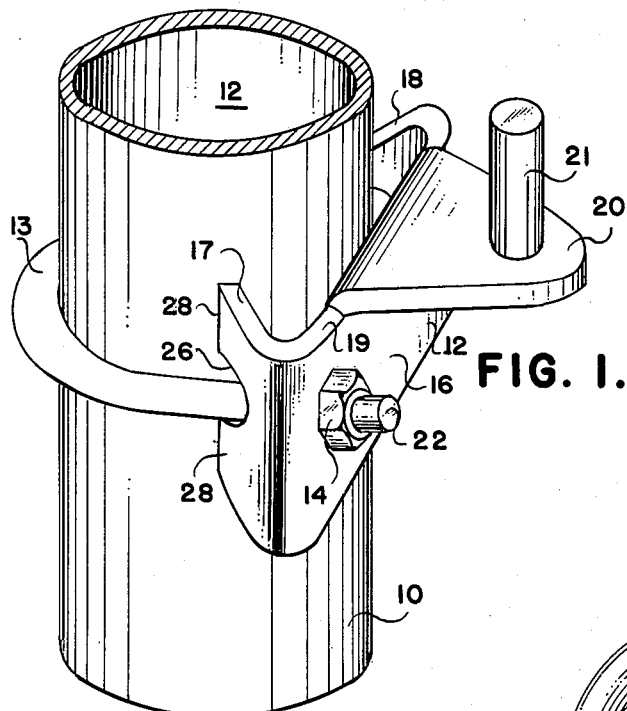
Figure 1 is a perspective view of the improved hinge pin support bracket secured to a section of supporting fence post.

As shown in Figure 1, the hinge pin support bracket is secured to a cylindrical post 10 which is a section of steel pipe containing the cylindrical channel 11. The bracket 12 is held against the support post by means of the U bolt 13 when the nuts 14 and 15 are tightened. The bracket consists of a flat center section 16 held horizontal and substantially tangent to the post 10 with the support ends 17 and 18 of the center section bent inwards and towards the surface of the post. Bent downwards or attached to the upper edge 19 of the center section is the horizontal flange 20 to which is secured the lower end of the hinge pin 21.

Figure 3:
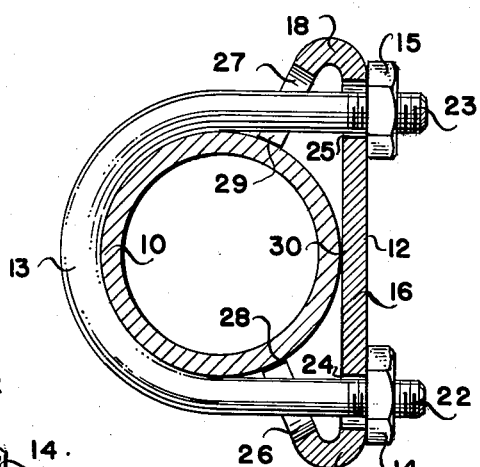
Figure 3 is a plan view of the hinge pin support bracket secured to a section of supporting fence post with the upper portion of the bracket broken away in section.
Figure 2:
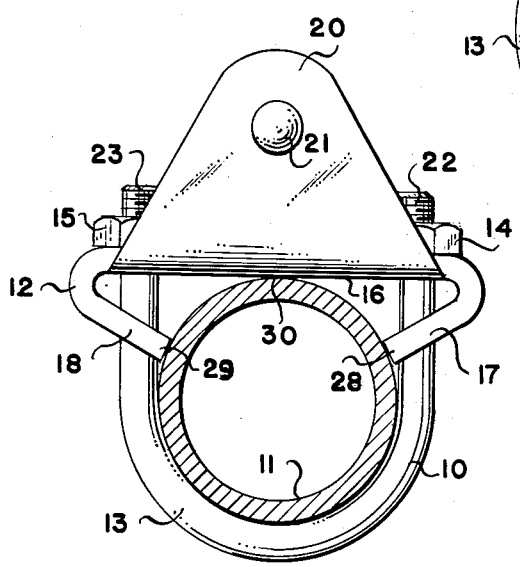
Figure 2 is plan view of the hinge pin support bracket secured to a section of supporting fence post.

As shown in Figure 2, the two legs 22 and 23 of the U bolts pass through the center section and the support ends. For this reason, as shown in Figure 3, the apertures 24 and 25 are formed in the center section and the slots 26 and 27 are formed in the support ends to accommodate the legs 22 and 23 of the U bolt.

During installation, the bracket is held in position, the U bolt is slipped in place around the post, and the nuts 14 and 15 are run up. At this point, the bracket contacts the post at the extremities 28 and 29 of the support ends and makes a tangential contact 30 at the middle of the center section. As the nuts are further tightened, the center section 16 is not deformed and bent about the post because the support ends are forced against the post and take up the strain.

Because most of the force exerted by the U bolt on the bracket is in turn exerted on the post only by the extremities of the support ends, the post may be slightly deformed at this point to insure a more positive clamping of the bracket. Even if the post is not measurably deformed at these areas of contact, a given force applied to a smaller area will insure a more positive clamping. The support ends should more or less extend towards the center of the post when the bracket is in position so that the support ends are nearly normal to the surface of the post. Then the structural arrangement of the center section and the support ends is such that, as the U bolt is tightened, the support ends will be in compression while the center section is in tension. This arrangement also minimizes any tendency for the support ends to bend relative to the center section and the strength to weight ratio is higher for this bracket compared to conventional brackets. Because they are more rugged in service and lighter in weight, these hinge pin support brackets may be more profitably used in permanent fence structures as well as in temporary barriers where they can be re-used many times.

This hinge pin support bracket may be very simply and cheaply made by forming it from a single heavy sheet of metal. First the general form would be stamped out, the support ends would be bent inwards, and the horizontal flange would be bent downwards into position. Finally the hinge pin would be attached to the horizontal flange. Although a U bolt is shown securing the bracket to a post, any mechanical equivalent of a U bolt may be used. In addition, the bracket may be cast, forged, welded, or formed by any suitable means.

While the invention has been disclosed in the best form known, it will nevertheless be understood that this is purely exemplary and that modifications of the construction, arrangement and combination of parts and substitution of equivalents may be made without departing from the spirit of the invention, except as it may be more particularly limited in the appended claims.

I claim:

1. A hinge pin support bracket comprising a flat center section adapted to be placed in approximate tangential contact with a cylindrical post, a first support end integral with one end of said center section and extending toward and contacting the surface of the post, a second support end integral with the other end of said center section and extending toward and contacting the surface of the post said support ends being disposed at an acute angle with respect to the plane of said center section and being directed toward the axis of the post, a vertical hinge pin, a horizontal flange fixed to the lower end of said hinge pin and integral with the upper portion of said center section, and means to urge said center section and said support ends into clamping engagement with the post.

2. A hinge pin support bracket comprising a flat center section adapted to be placed in approximate tangential contact with a cylindrical post and provided with an aperture placed near each end of said center section further apart than the diameter of the post, a first support end formed integrally with one end of said center section and extending toward and contacting the surface of the post provided with a slot extending into said support end from the surface of the post, a second support end formed integrally with the other end of said center section and extending toward and contacting the surface of the post provided with a slot extending into said support end from the surface of the post, said support ends being disposed at an acute angle with respect to the plane of said center section and being directed toward the axis of the post a vertical hinge pin, a horizontal flange fixed to the lower end of said hinge pin and formed integrally with the upper edge of said center section, and a U bolt adapted to fit about the post and extend through the slots in said support ends and the apertures in said center section to hold said center section and said support ends in clamping engagement with the post.

3. A hinge pin support bracket comprising a flat center section adapted to be placed in approximate tangential contact across a cylindrical post provided with two apertures in said center section further apart than the diameter of the post, support ends formed integrally with each end of said center section extending toward the axis of said post and contacting the surface of said post with a slot extending into each of said support ends from the surface of the post, a vertical hinge pin, a horizontal flange fixed to the lower end of said hinge pin and formed integrally with the upper edge of said center section and being bent outwardly therefrom so that said flange extends away from the post, and a U bolt adapted to fit around the post and extend through the slots in said support ends and through the apertures in said center section to hold said center section under tension in engagement with said post and said support ends in compressive clamping engagement with the post.

4. A hinge pin support bracket comprising a flat center section adapted to be placed in approximate tangential contact across a cylindrical post with two apertures in said center section further apart than the diameter of the post, two support ends bent from each end of said center section towards the axis of the post and contacting the surface of the post with a slot in each of said support ends extending from the surface of the post, a vertical hinge pin, a horizontal flange bent downward from the upper edge of said center section away from the post and fixed to the lower end of said hinge pin, and a U-bolt adapted to fit around the post and extend through the slots in said support ends and through the apertures in said center section to hold said center section and said support ends in clamping engagement with the post.

5. A hinge pin support bracket adapted to be secured to a substantially cylindrical post comprising a flat center section adapted to be disposed in substantially tangential contact across a post, said section being provided with apertures in alignment with diametrically opposing sides of said post, the ends of said section being bent toward the axis of said post for abutment with the surface thereof, each of said ends being provided with a slot in alignment with a corresponding aperture whereby a U-bolt may be secured in surrounding relation with respect to said post and with its extremities extending through said slots and apertures respectively to thereby clamp said bracket to said post, a horizontal flange bent outwardly from a horizontal edge of said center section extending away from said post, and a vertically disposed hinge pin fixed to said horizontal flange.

6. A hinge pin supporting bracket comprising a flat center section, the ends of said section being bent inwardly toward each other and being disposed at an acute angle with respect to the plane of said section, in the direction of the axis of said post each of said ends being provided with a terminal slot and said center section being provided with an aperture in alignment with each of said slots, a flange bent outwardly from one of the side edges of said center section, the plane of said flange being disposed substantially normal to the plane of said center section and a hinge pin fixed to said flange the axis of said pin being disposed at right angles with respect to the plane of said flange.

References Cited in the file of this patent

UNITED STATES PATENTS

| | | |
|---|---|---|
| 1,043,260 | Shover | Nov. 5, 1912 |
| 1,343,499 | Ferguson | June 15, 1920 |
| 1,469,425 | Mehanna | Oct. 2, 1923 |
| 1,808,196 | Williams | June 2, 1931 |
| 1,985,951 | Richterkessing | Jan. 1, 1935 |
| 2,689,102 | Whalen | Sept. 14, 1954 |